(12) United States Patent
Sohn et al.

(10) Patent No.: US 12,491,766 B2
(45) Date of Patent: Dec. 9, 2025

(54) APPARATUS AND METHOD OF CONTROLLING VEHICLE EQUIPPED WITH OPERATING SWITCH LINKED TO TOUCH PANEL OF DIGITAL SIDE MIRROR SYSTEM

(71) Applicants: Hyundai Motor Company, Seoul (KR); Kia Corporation, Seoul (KR); SL Mirrortech Corporation, Siheung-Si (KR)

(72) Inventors: Chang Woo Sohn, Seoul (KR); Byeong Kwan Kim, Hwaseong-Si (KR); Soo Man Jung, Hwaseong-Si (KR); Choon Gi Jung, Seoul (KR); Mu Youl Lee, Daegu (KR); Chul Jung, Incheon (KR); Woo Young Chung, Uiwang-Si (KR); Seok Keon Kwon, Anyang-Si (KR)

(73) Assignees: Hyundai Motor Company, Seoul (KR); Kia Corporation, Seoul (KR); SL Mirrortech Corporation, Siheung-Si (KR)

( * ) Notice: Subject to any disclaimer, the term of this patent is extended or adjusted under 35 U.S.C. 154(b) by 202 days.

(21) Appl. No.: 18/218,406

(22) Filed: Jul. 5, 2023

(65) Prior Publication Data
US 2024/0157792 A1    May 16, 2024

(30) Foreign Application Priority Data
Nov. 16, 2022    (KR) .......................... 10-2022-0153808

(51) Int. Cl.
*B60K 35/22*    (2024.01)
*B60R 1/12*    (2006.01)
(Continued)

(52) U.S. Cl.
CPC ................ *B60K 35/22* (2024.01); *B60R 1/12* (2013.01); *B60K 35/10* (2024.01); *B60R 35/28* (2024.01);
(Continued)

(58) Field of Classification Search
CPC ..... B60R 1/26; B60R 2300/8046; B60R 1/12; B60R 11/04
See application file for complete search history.

(56) References Cited

U.S. PATENT DOCUMENTS 9,063,569 B2 *   6/2015   Tanaka ................ G06F 3/04812
9,908,472 B2     3/2018   Wippler
(Continued)

FOREIGN PATENT DOCUMENTS

CN   109318809 A   *   2/2019
DE   102009025205 A1 *   4/2010   ............... B60R 1/00
(Continued)

*Primary Examiner* — Justin S Lee
(74) *Attorney, Agent, or Firm* — Banner & Witcoff, Ltd.

(57) ABSTRACT

An apparatus for controlling a vehicle according to an embodiment of the present disclosure includes: a processor; a memory storing one or more programs configured to be executed by the processor; and the one or more programs include instructions for: a first determination unit configured to determine whether the vehicle is in a driving state; a first controller configured to deactivate a touch mode of the touch panel provided in the digital side mirror system when the vehicle is determined to be in the driving state; a second determination unit configured to determine whether the vehicle is in a switch mode for controlling the function of the vehicle through the operating switch; and a second controller configured to control a driver to perform a function from a menu selected through the operating switch when the vehicle is determined to be in the switch mode.

20 Claims, 11 Drawing Sheets

(51) Int. Cl.
*B60K 35/10* (2024.01)
*B60K 35/28* (2024.01)
*B60K 35/29* (2024.01)
*B60K 35/60* (2024.01)

(52) U.S. Cl.
CPC .............. *B60K 35/29* (2024.01); *B60K 35/60* (2024.01); *B60K 2360/115* (2024.01); *B60K 2360/1434* (2024.01); *B60K 2360/1446* (2024.01); *B60K 2360/1468* (2024.01); *B60K 2360/176* (2024.01); *B60K 2360/197* (2024.01); *B60K 2360/788* (2024.01); *B60R 2001/1253* (2013.01); *B60R 2300/105* (2013.01); *B60R 2300/306* (2013.01); *B60R 2300/8046* (2013.01)

(56) References Cited

U.S. PATENT DOCUMENTS

| | | |
|---|---|---|
| 10,252,671 B2 | 4/2019 | Hoenninger |
| 2006/0167606 A1* | 7/2006 | Malhas .................. B60R 1/025 |
| | | 701/49 |
| 2007/0194902 A1* | 8/2007 | Blanco ................. G01C 21/365 |
| | | 340/461 |
| 2015/0042803 A1* | 2/2015 | Heinemann ............... B60R 1/26 |
| | | 348/148 |
| 2016/0381303 A1* | 12/2016 | Takami .................. H04N 23/88 |
| | | 348/223.1 |
| 2018/0018939 A1 | 1/2018 | Choi et al. |
| 2018/0326851 A1* | 11/2018 | Kim ..................... B60K 35/215 |
| 2019/0070963 A1* | 3/2019 | Jang ..................... B60K 35/00 |
| 2019/0161014 A1* | 5/2019 | Ko ............................ B60S 1/02 |
| 2019/0366930 A1* | 12/2019 | Valladares Meza .... B60R 1/072 |
| 2020/0401818 A1* | 12/2020 | Gibert Castroverde ..................... |
| | | B60K 35/22 |
| 2021/0213878 A1* | 7/2021 | Schondorf ............... B60R 1/002 |
| 2021/0362653 A1* | 11/2021 | Beauregard ............. B60R 11/04 |
| 2022/0083794 A1* | 3/2022 | Bronte .................... B60R 11/04 |
| 2023/0069348 A1* | 3/2023 | Park ........................ G06F 3/147 |
| 2023/0119041 A1* | 4/2023 | Yoon ......................... B60R 1/12 |
| | | 348/187 |
| 2023/0406224 A1* | 12/2023 | Yu ............................ H04L 65/61 |

FOREIGN PATENT DOCUMENTS

| | | | |
|---|---|---|---|
| JP | 2011511332 A | * | 4/2011 |
| JP | 6919740 B2 | | 8/2021 |
| JP | 2021-142958 A | | 9/2021 |
| KR | 10-2002-0049460 A | | 6/2002 |
| KR | 101816423 B1 | | 1/2018 |
| KR | 10-2019-0060490 A | | 6/2019 |

* cited by examiner

APPARATUS AND METHOD OF CONTROLLING VEHICLE EQUIPPED WITH OPERATING SWITCH LINKED TO TOUCH PANEL OF DIGITAL SIDE MIRROR SYSTEM

CROSS-REFERENCE TO RELATED APPLICATION(S)

This application claims benefit of priority to Korean Patent Application No. 10-2022-0153808 filed on Nov. 16, 2022, in the Korean Intellectual Property Office, the disclosure of which is incorporated herein by reference in its entirety.

BACKGROUND

1. Field

The present disclosure relates to an apparatus and a method of controlling a vehicle equipped with an operating switch.

2. Discussion of the Background

In general, side mirrors for allowing a driver to recognize a rear vehicle may be mounted on opposite sides of a vehicle. Such side mirrors may help the driver drive safely, but aerodynamic resistance may be generated due to side mirrors during the driving of the vehicle, resulting in problems such as reduced fuel efficiency and noise generation.

Accordingly, a digital side mirror system may replace such side mirrors. The digital side mirror system may include a camera capturing a rear image and a display for displaying the rear image, and one camera may be installed in each position in which the side mirrors are generally placed, and one display may also be installed on each of the driver's side and the passenger's side.

The camera may be configured to be smaller than a side mirror, thereby reducing air resistance, and the display may be implemented with a touch panel to control pan and tilt of images displayed on a touch panel through a touch operation.

However, when the vehicle is driving at a certain speed or higher, it may be difficult and dangerous for the driver to perform a touch manipulation (e.g., the driver may need to reach out his/her hand to operate the touch panel on the passenger's side), which may increase the risk of accidents.

SUMMARY

The following summary presents a simplified summary of certain features. The summary is not an extensive overview and is not intended to identify key or critical elements.

An aspect of the present disclosure is to provide an apparatus and a method of controlling a vehicle equipped with an operating switch linked to a touch panel of a digital side mirror system, which can reduce the risk of accidents due to an operation of a touch panel.

An apparatus may comprise: a processor; and a memory storing instructions that, when executed by the processor, cause the apparatus to: determine whether a vehicle is in a driving state; deactivate, based on the vehicle being in the driving state, a touch mode of a touch panel associated with a digital side mirror system of the vehicle; determine whether the vehicle is in a switch mode for controlling at least one operation of the vehicle controlled by an operating switch; and perform, based on a menu item selected via the operating switch and based on the vehicle being in the switch mode, an operation associated with the digital side mirror system.

The apparatus may further comprise the digital side mirror system, wherein the digital side mirror system comprises: a camera configured to capture a rear side image associated with the vehicle; and the touch panel, wherein the touch panel is configured to display a cropped image, associated with the captured rear side image, and menu items for controlling the at least one operation associated with the digital side mirror system, and wherein the touch panel is configured to identify at least one menu item of the menu items selected by a touch input received in the touch mode.

The instructions, when executed by the processor, may cause the apparatus to activate the switch mode based on: a confirmation button of the operating switch being pressed for a preset time period; or the confirmation button of the operating switch being pressed a preset number of times within a preset time period.

The menu items may comprise at least one of: opening or closing of a window, opening or closing a door, panning and tilting of a displayed image, folding or unfolding the camera, locking or unlocking the door, a child lock, and a brightness setting.

The instructions, when executed by the processor, may cause the apparatus to control at least one of: a first driver for opening or closing of a window; a second driver for opening and closing a door; a third driver for locking or unlocking the door or a child lock; a fourth driver for folding or unfolding a camera; an image controller for controlling pan and tilt of a displayed image; or a brightness controller for controlling screen brightness of the touch panel.

The operating switch may comprise a confirmation button and four direction buttons indicating up, down, left and right movements, respectively, and the operating switch is provided on a crossbar of a handle of the vehicle.

The digital side mirror system may comprise at least one of: a first digital side mirror equipped with a first camera configured to capture a first rear side image and a first touch panel configured to display a cropped image associated with the captured first rear side image; and a second digital side mirror equipped with a second camera configured to capture a second rear side image and a second touch panel configured to display a cropped image associated with the captured second rear side image.

The first camera may be provided at a first exterior position, of the vehicle, that is associated with a driver's seat of the vehicle. The second camera may be provided at a second exterior position, of the vehicle, that is associated with a passenger's seat of the vehicle. The first touch panel may be provided in a lower portion of an A-pillar inside the vehicle at the driver's seat of the vehicle. The second touch panel may be provided in a lower portion of an A-pillar inside the vehicle at the passenger's seat of the vehicle.

The instructions, when executed by the processor, may cause the apparatus to crop and display the captured rear side image according to a size of the touch panel, wherein the displayed rear side image comprises a virtual region including a prescribed range of a field of view (FOV) according to predetermined regulations, and wherein the instructions, when executed by the processor, cause the apparatus to display the menu items in a region other than the virtual region.

The instructions, when executed by the processor, may cause the apparatus to limit a movement of a pointer into a region comprising a field of view (FOV) based on: the pointer being displayed on the touch panel; and a control signal of the operating switch that indicates a movement of the displayed pointer into the region.

A method may comprise: determining, by a computing device, whether a vehicle is in a driving state; deactivating, by the computing device and based on the vehicle being in the driving state, a touch mode of a touch panel associated with a digital side mirror system of the vehicle; determining, by the computing device, whether the vehicle is in a switch mode for controlling at least one operation of the vehicle controlled by an operating switch; and performing, based on a menu item selected via the operating switch and based on the vehicle being in the switch mode, an operation associated with the digital side mirror system.

The method may further comprise capturing, by a camera, a rear side image associated with the vehicle; and displaying, via the touch panel, a cropped image, associated with the captured rear image, and menu items for controlling the at least one operation associated with the digital side mirror system; and identifying at least one menu item of the menu items selected by a touch input received in the touch mode.

The method may further comprise activating the switch mode based on: a confirmation button of the operating switch being pressed for a preset time period; or the confirmation button of the operating switch being pressed a preset number of times within a preset time period.

The menu items may comprise at least one of: opening or closing of a window, opening or closing a door, panning and tilting of a displayed image, folding or unfolding of the camera, locking or unlocking of the door, a child lock, and brightness setting.

The method may further comprise controlling at least one of: a first driver for opening or closing of a window; a second driver for opening or closing a door; a third driver for locking or unlocking the door or a child lock; a fourth driver for folding or unfolding a camera; an image controller for controlling pan and tilt of a displayed image; or a brightness controller for controlling screen brightness of the touch panel.

The operating switch may comprise a confirmation button and four direction buttons indicating up, down, left and right movements, respectively, and the operating switch is provided on a crossbar of a handle of the vehicle.

The method may further comprise capturing, via a first digital side mirror equipped with a first camera, a first rear side image and displaying, via a first touch panel, a cropped image associated with the captured first rear side image; and capturing, via a second digital side mirror equipped with a second camera, a second rear side image and displaying, via a second touch panel, a cropped image associated with the captured second rear side image.

The method may further comprise cropping and displaying the captured rear side image according to a size of the touch panel, wherein the displayed rear side image comprises a virtual region including a prescribed range of a field of view (FOV) according to predetermined regulations; and displaying the menu items in a region other than the virtual region.

The method may further comprise limiting a movement of a pointer into a region comprising a field of view (FOV) based on: the pointer being displayed on the touch panel; and a control signal of the operating switch that indicates a movement of the displayed pointer into the region.

The first camera may be provided at a first exterior position, of the vehicle, that is associated with a driver's seat of the vehicle. The second camera may be provided at a second exterior position, of the vehicle, that is associated with a passenger's seat of the vehicle. The first touch panel may be provided in a lower portion of an A-pillar inside the vehicle at the driver's seat of the vehicle. The second touch panel may be provided in a lower portion of an A-pillar inside the vehicle at the passenger's seat of the vehicle.

According to an aspect of the present disclosure, when a vehicle is in a driving state, a touch mode of a touch panel of a digital side mirror system may be deactivated and the function of the vehicle may be controlled through an operating switch provided in a crossbar of a handle, thereby reducing the risk of accidents caused by an operation of the touch panel.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
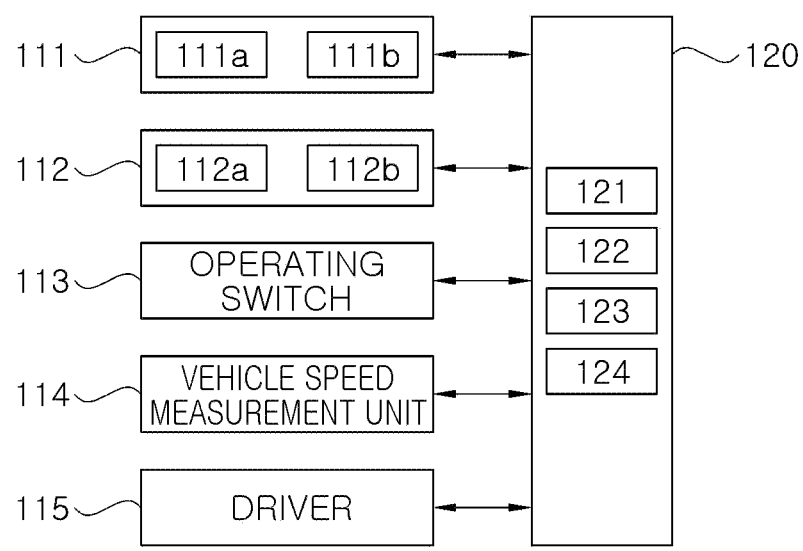
FIG. 1 is a block diagram of an apparatus for controlling a vehicle.

Hereinafter, various features of the present disclosure will be described in detail with reference to the accompanying drawings. The disclosure may, however, be embodied in many different forms and should not be construed as being limited to the examples set forth herein. In the drawings, the shapes and sizes of the elements may be exaggerated for clarity. Like reference numerals in the drawings denote like elements, and thus redundant descriptions thereof will be omitted.

Figure 2:
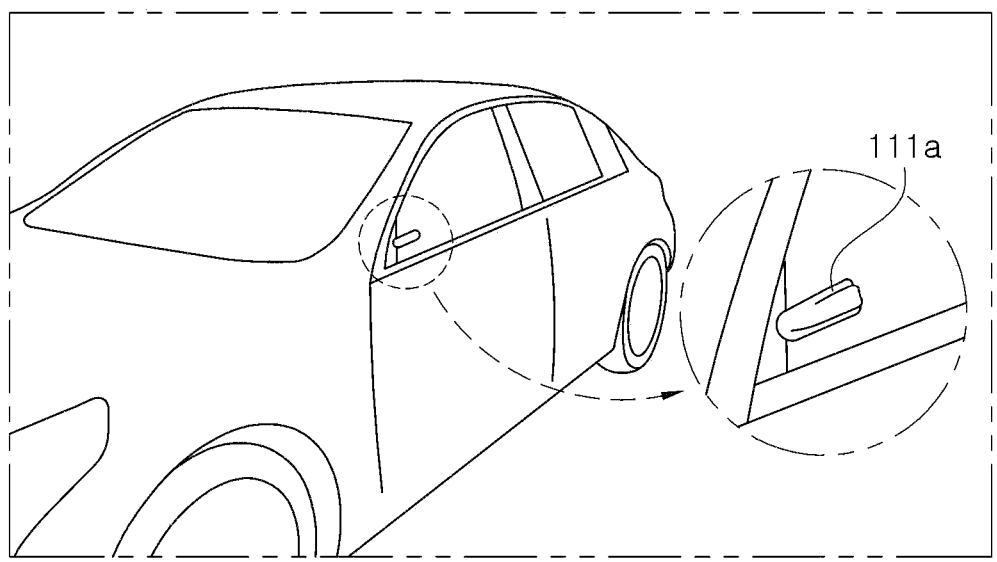
FIG. 2 is a view illustrating an installation position of a camera.
Figure 3:
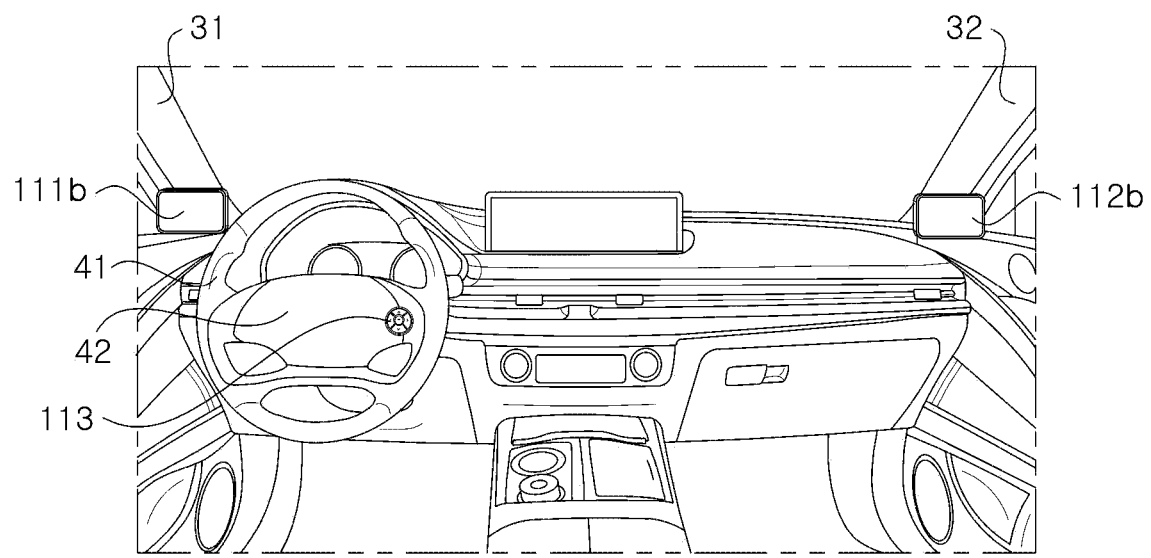
FIG. 3 is a view illustrating an installation position of a touch panel.
Figure 4:
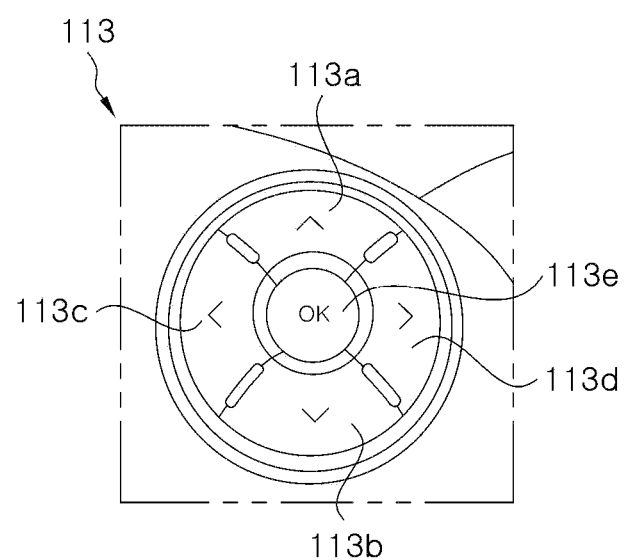
FIG. 4 is a view illustrating an operating switch.

FIG. 1 is a block diagram of an apparatus for controlling a vehicle, FIG. 2 is a view illustrating an installation position of a camera, and FIG. 3 is a view illustrating an installation position of a touch panel. FIG. 4 is a view illustrating an operating switch.

As illustrated in FIG. 1, an apparatus 100 for controlling a vehicle may include a first digital side mirror system 111, a second digital side mirror system 112, an operating switch 113, a vehicle speed measurement unit 114 (e.g., one or more vehicle speed sensors), a driver 115, and a controller 120.

The first digital side mirror system 111 may include a first camera 111a and a first touch panel 111b, the second digital side mirror system 112 may include a second camera 112a and a second touch panel 112b, and the controller 120 may include a first determination unit 121, a first controller 122, a second determination unit 123, and a second controller 124. The controller 120 may include one or more processors and memory storing instructions that, when executed by the one or more processors, implement one of more features of the first determination unit 121, the first controller 122, the second determination unit 123, and/or the second controller 124.

The first digital side mirror system 111 may include a first camera 111a capturing a rear side image at a driver's seat, and the first touch panel 111b displaying a cropped rear side image among the captured rear side images at the driver's seat.

The second digital side mirror system 112 may include a second camera 112a capturing a rear side image at a passenger's seat, and the second touch panel 112b displaying a cropped rear side image among the captured rear side images at the passenger's seat.

As illustrated in FIG. 2, the first camera 111a of the cameras 111a and 112a described above may be provided in a position of an existing side mirror outside the vehicle at the driver's seat. Similarly, although not illustrated in FIG. 2, the second camera 112a among the cameras 111a and 112a may be provided in a position of an existing side mirror outside the vehicle at the passenger's seat.

At least one of the touch panels 111b and 112b may display menus for controlling the cropped rear side image and one or more functions of the vehicle, or may have one of the menus input by a user's touch in a touch mode.

Figure 5:
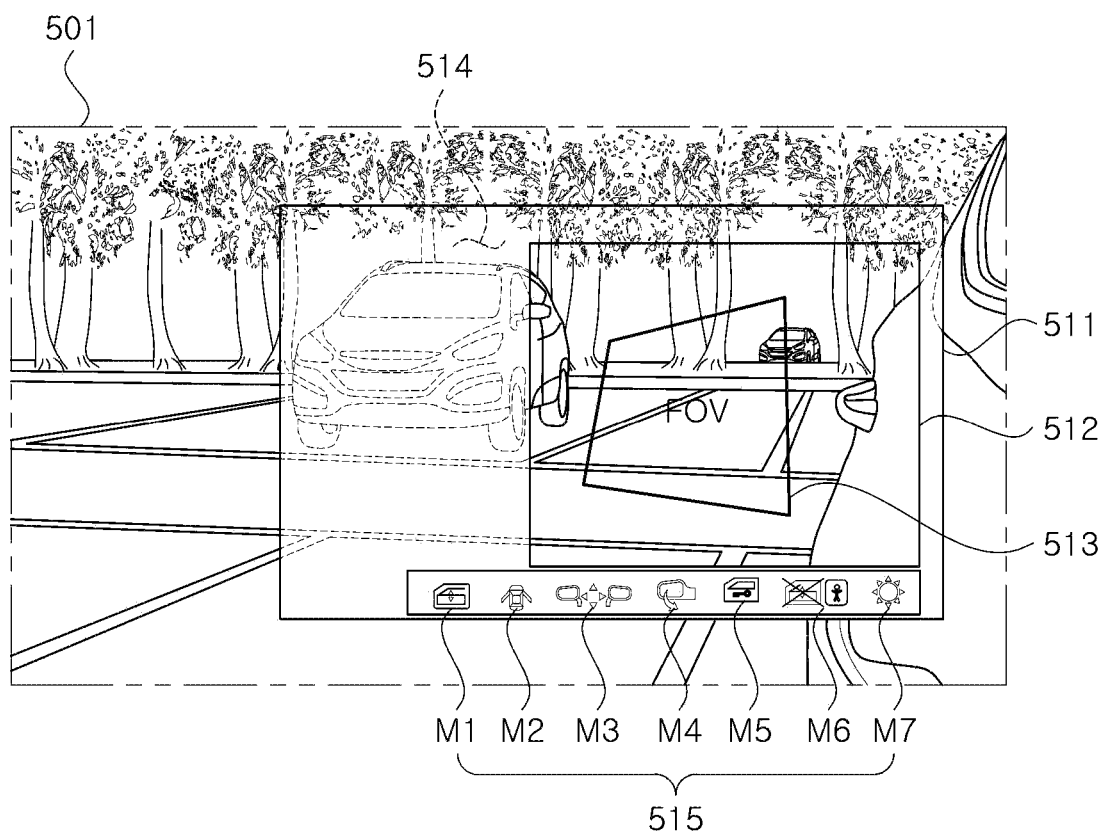
FIG. 5 is a view illustrating a rear side image captured by the camera.
Figure 6:
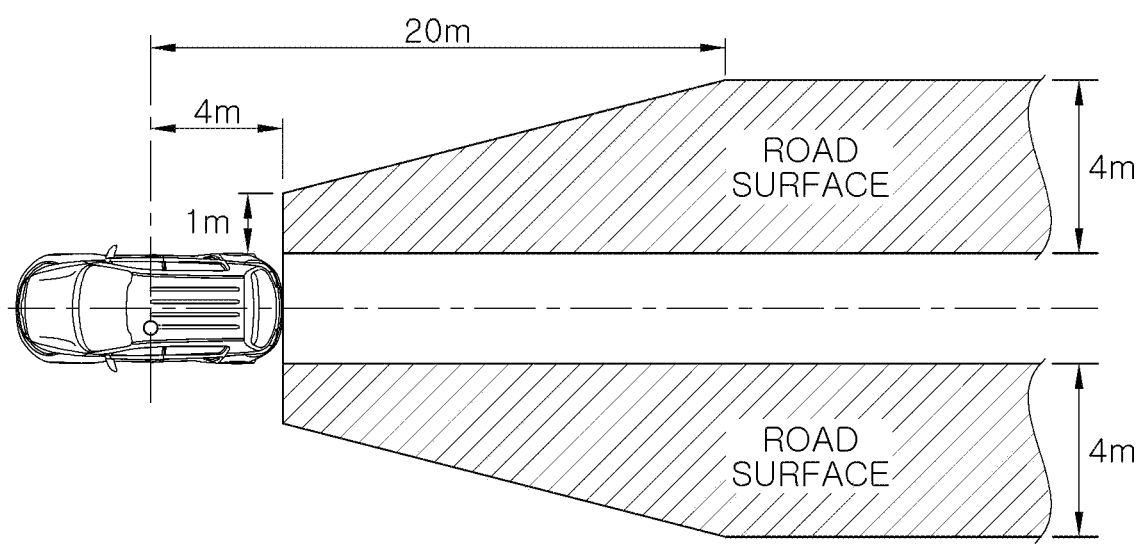
FIG. 6 is a view illustrating a field of view (FOV) according to UNR46-04 regulations.

FIG. 5 is a view illustrating a rear side image captured by the camera, and FIG. 6 is a view illustrating a field of view (FOV) according to UNR46-04 regulations.

As illustrated in FIG. 5, a rear side image 501 at the driver's seat captured by the camera may be cropped and displayed as illustrated in a reference numeral 511 depending on the size of the first touch panel 111b.

A displayed rear side image 511 may include a virtual region 512 including a prescribed range of a field of view (FOV) 513 according to predetermined regulations, and menus 515 for controlling the one or more functions of the vehicle may be displayed (e.g., only in a region other than the virtual region 512 among the displayed rear side images 511).

The menus 515 may include at least one of opening or closing of a window (M1), opening or closing a door (M2), pan and tilt of a camera (M3), folding or unfolding the camera (M4), locking or unlocking the door (M5), a child lock (M6), and brightness setting (M7).

Although FIG. 5 illustrates the captured rear side image 501 at the driver's seat, the rear side image at the passenger's seat may also be illustrated in the same manner.

The above-described field of view may be determined according to the following R46-04 regulations with respect to FIG. 6. However, aspects of the present disclosure are not limited thereto.

1. Field of View at the Driver's Seat

The field of vision shall be such that the driver can see at least a 4 m wide, flat, horizontal portion of the road, which is bounded by a plane parallel to the median longitudinal vertical plane and passing through the outermost point of the vehicle on the driver's side of the vehicle and extends from 20 m behind the driver's ocular points to the horizon. In addition, the road shall be visible to the driver over a width of 1 m, which is bounded by a plane parallel to the median longitudinal vertical plane and passing through the outermost point of the vehicle starting from a point 4 m behind the vertical plane passing through the driver's ocular points.

2. Field of View at the Passenger's Seat

The field of vision shall be such that the driver can see at least a 4 m wide, flat, horizontal portion of the road which is bounded by a plane parallel to the median longitudinal vertical plane passing through the outermost point of the vehicle on the passenger's side which extends from 20 m behind the driver's ocular points to the horizon.

In addition, the road shall be visible to the driver over a width of 1 m, which is bounded by a plane parallel to the median longitudinal vertical plane and passing through the outermost point of the vehicle starting from a point 4 m behind the vertical plane passing through the driver's ocular points.

As illustrated in FIG. 3, the first touch panel 111b of the touch panels 111b and 112b may be provided in a lower portion of an A-pillar 31 at the driver's seat inside the vehicle, and the second touch panel 112b of the touch panels 111b and 112b may be provided in a lower portion of the A-pillar 32 at the passenger's seat inside the vehicle.

The positions of the cameras 111a and 112a or the positions of the touch panels 111b and 112b described above are exemplary, and the cameras 111a and 112a and the touch panels 111b and 112b may be provided in various positions.

As illustrated in FIG. 3, the operating switch 113 may be provided on a crossbar 42 of a handle 41 (or any other positions in proximity to the handle 41 and/or a driver seat).

As illustrated in FIG. 4, the operating switch 113 may include four direction buttons 113a to 113d indicating up, down, left and right movements, respectively, and a confirmation button 113e.

The vehicle speed measurement unit 114 may measure a vehicle speed through a wheel speed sensor or the like, and transmit the measured vehicle speed to the controller 120.

The driver 115 may perform an operation corresponding to a selected menu (e.g., a menu selected through the operating switch 113 among the menus displayed on the touch panels 111b and 112b according to an instruction of the controller 120 or a menu selected by a user's touch in the touch mode).

The driver 115 may include a first driver for opening or closing of a window, a second driver for opening or closing a door, a third driver for locking or unlocking the door, a fourth driver for folding or unfolding a camera, an image controller for controlling pan and tilt of the displayed image, and a brightness controller for controlling screen brightness of touch panels.

The controller 120 may include the first determination unit 121, the first controller 122, a second determination unit 123, and the second controller 124.

The first determination unit 121 may determine whether the vehicle is in a driving state, for example, based on a vehicle speed measured by the vehicle speed measurement unit 114.

For example, if the vehicle speed is higher than or equal to a preset speed, the first determination unit 121 may determine that the vehicle is in the driving state.

The preset speed may be, for example, 10 km/h, but aspects of the present disclosure are not limited to the above-described specific numerical value.

If the vehicle is determined to be in the driving state, the first controller 122 may deactivate the touch mode of the touch panels 111*b* and 112*b* provided in the digital side mirror systems 111 and 112.

The second determination unit 123 may determine whether the vehicle is in a switch mode for controlling the function of the vehicle through the operating switch 113, for example, after the first controller 122 deactivates the touch mode.

In a case in which the confirmation button 113*e* of the operating switch 113 is pressed for a preset time or more, or the confirmation button 113*e* of the operating switch 113 is pressed a preset number of times for the preset time, the second determination unit 123 may determine the case as the switch mode.

The preset time may be, for example, several seconds, and the preset number of times may be, for example, two times, but aspects of the present disclosure are not limited to the above-described specific values.

If the second controller 124 determines the vehicle to be in a switch mode, the second controller 124 may control the driver 115 to perform a function associated with the menu (e.g., a menu item) selected through the operating switch 113 among the menus (e.g., menu items). As described above, the driver 115 may include the first driver for opening or closing the window, the second driver for opening or closing a door, the third driver for locking or unlocking of the door and a child lock, the fourth driver for folding or unloading a camera, an image controller for controlling pan and tilt of a displayed image, and a brightness controller for controlling screen brightness of the touch panel.

Figure 7:
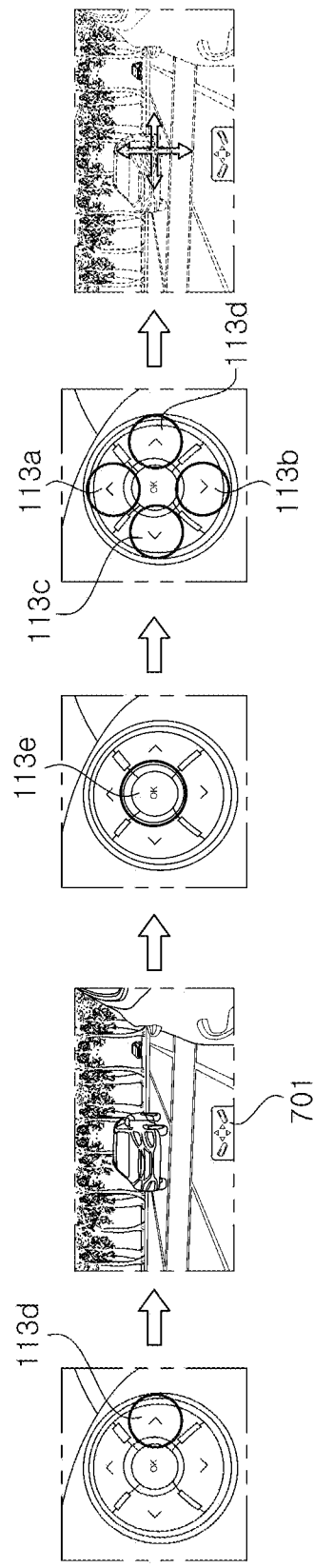
FIGS. 7A, 7B, 7C, 7D, and 7E are views illustrating a process of controlling pan and tilt of the rear side image displayed using the operating switch.

Hereinafter, in order to help gain an understanding of the present disclosure, a process of controlling pan and tilt of the rear side image displayed using the operating switch 113 and a process of controlling opening and closing of the window will be described with reference to FIGS. 5, 7, and 8. In these examples, the vehicle speed may be higher than or equal to a preset speed and the vehicle may be in a switch mode.

FIGS. 7A, 7B, 7C, 7D, and 7E are views illustrating a process of controlling pan and tilt of the rear side image displayed using the operating switch.

The driver may operate left and right buttons 113*c* and 113*d* of the operating switch 113 to select the pan and tilt menu M3 of the rear side image displayed among the menus 515 illustrated in FIG. 5, and may press the confirmation button 113*e*.

As illustrated in FIG. 7A, the rear side image at either the driver's seat or the passenger's seat may be selected by operating the left and right buttons 113*c* and 113*d* of the operating switch 113. In the illustrated example, the rear side image at the driver's seat may be selected, and accordingly, as illustrated in FIG. 7B, the rear side image at the driver's seat may be displayed. A reference numeral 701 illustrated in FIG. 7B illustrates pan and tilt of the displayed image among the menus.

As illustrated in FIG. 7C, the confirmation button 113*e* of the operating switch 113 may be pressed.

As illustrated in FIG. 7D, up, down, left and right buttons 113*a* to 113*d* of the operating switch 113 may be operated. Accordingly, the second controller 124 may control the pan or the tilt of the displayed rear side image, and as illustrated in FIG. 7E, a panned or tiled rear side image may be displayed through the second touch panel 112*b*.

Figure 8:
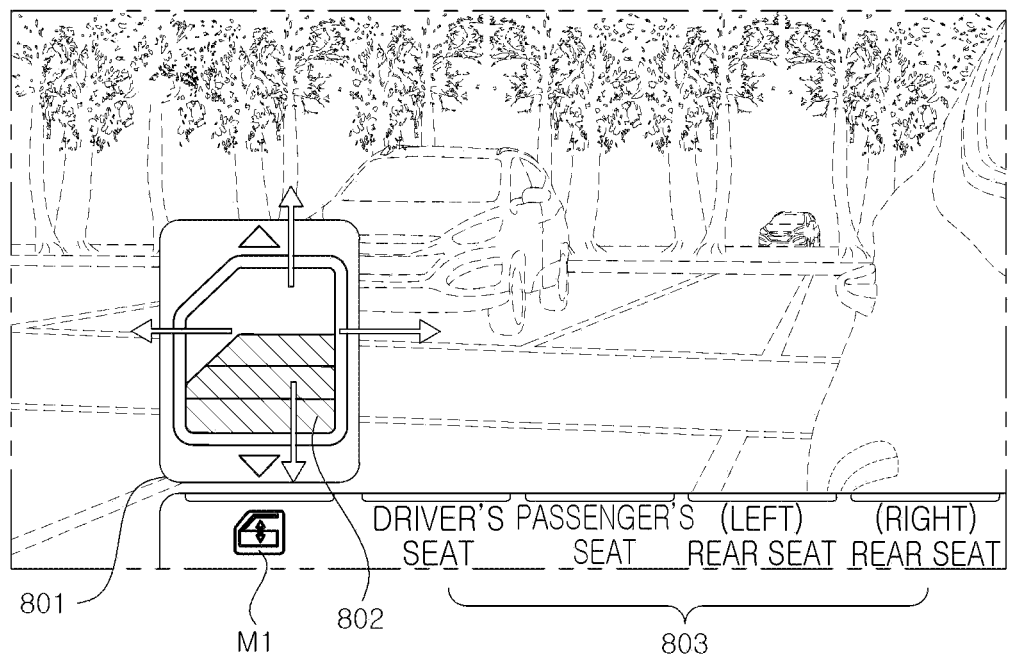
FIG. 8 is a view illustrating a process of controlling opening or closing of a window using the operating switch.

FIG. 8 is a view illustrating a process of controlling opening or closing of a window using the operating switch.

As illustrated in FIGS. 1, 5, and 8, the driver may operate the left and right buttons 113*c* and 113*d* of the operating switch 113 to select the window opening and closing menu (M1) among the menus 515 illustrated in FIG. 5, and may press the confirmation button 113*e*.

Accordingly, a sub-menu 803 indicating the driver's seat, the passenger's seat, a (left) rear seat and a (right) rear seat, and a sub-menu 801 illustrating the degree of opening and closing of a window 802 may be displayed.

A desired seat (e.g., a target seat to be selected) and a degree of opening and closing of the window may be selected by operating the left and right buttons 113*c* to 113*d* of the operating switch 113 and the confirmation button 113*e* may be pressed. In the illustrated example, after the (left) rear seat and the (right) rear seat are selected by operating the left and right buttons 113*c* to 113*d*, the confirmation button 113*e* is pressed, and after level 3 among a total of five levels for the degree of the opening and closing is selected by operating the up and down buttons 113*a* and 113*b*, the confirmation button 113*e* is pressed. Accordingly, the second controller 124 may open the window of the (left) rear seat and the window of the (right) rear seat to level 3.

Figure 9:
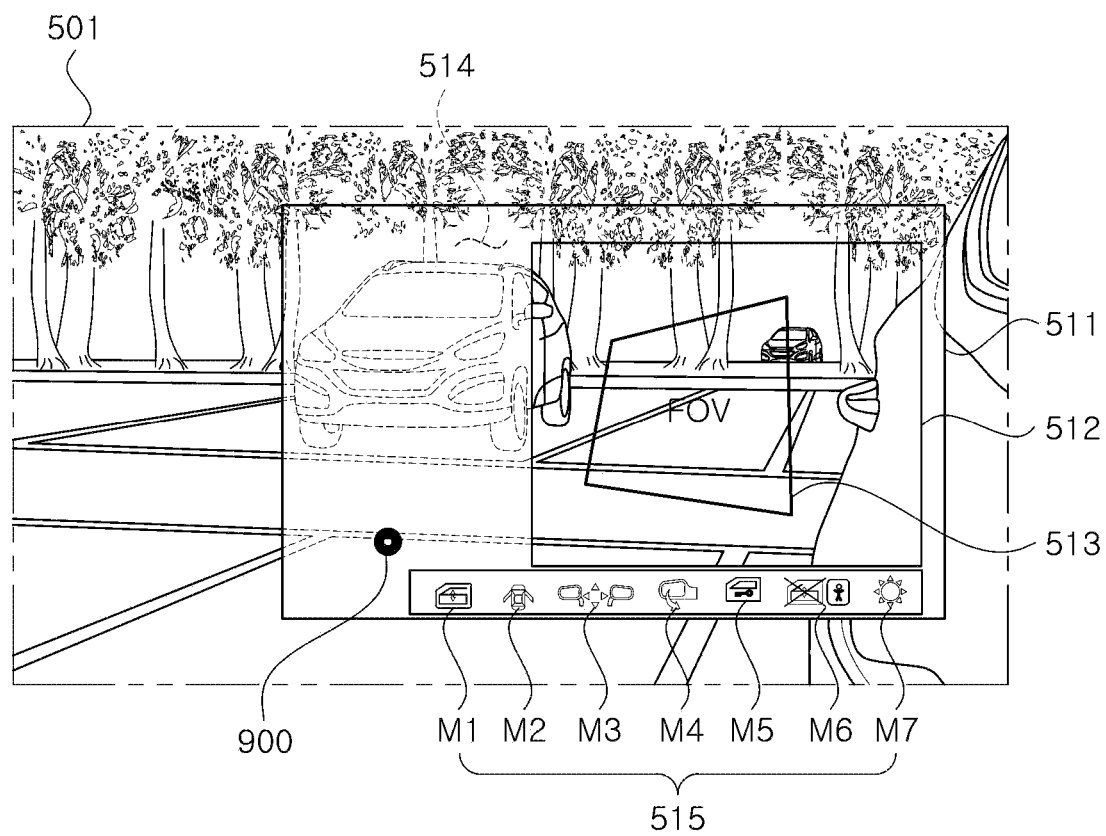
FIG. 9 is a view illustrating a method of selecting a menu by moving a pointer.

FIG. 9 is a view illustrating a method of selecting a menu by moving a pointer.

According to the aforementioned example method, the displayed menu may change directly from a current menu to a following menu when pressing the direction buttons 113*a* to 113*d* of the operating switch 113, while FIG. 9 may illustrate a method of displaying a pointer 900 on the touch panel and moving the displayed pointer 900 using the direction buttons 113*a* to 113*d* of the operating switch 113 to select a menu of the corresponding position.

In this example, a movement of the pointer 900 into the virtual region 512 may be limited. To this end, the second controller 124 may obtain positional coordinates of the pointer 900 in real time in a displayed rear side image 511, and may restrict the movement of the pointer 900 so that the positional coordinates of the pointer 900 are not displayed in the virtual region 512 comprising the field of view (FOV).

In FIG. 9, a reference numeral 514 denotes a region other than the virtual region 512 among the displayed rear side images 511.

After the operation of the aforementioned operating switch 113 is completed, a notification (e.g., setting is completed) may be further displayed through the touch panel.

As described above, if the vehicle is in the driving state, the touch mode of the touch panel of the digital side mirror system may be deactivated and the function of the vehicle may be controlled through the operating switch provided on the crossbar of the handle, thereby reducing the risk of accidents caused by the operation of the touch panel.

Figure 10:
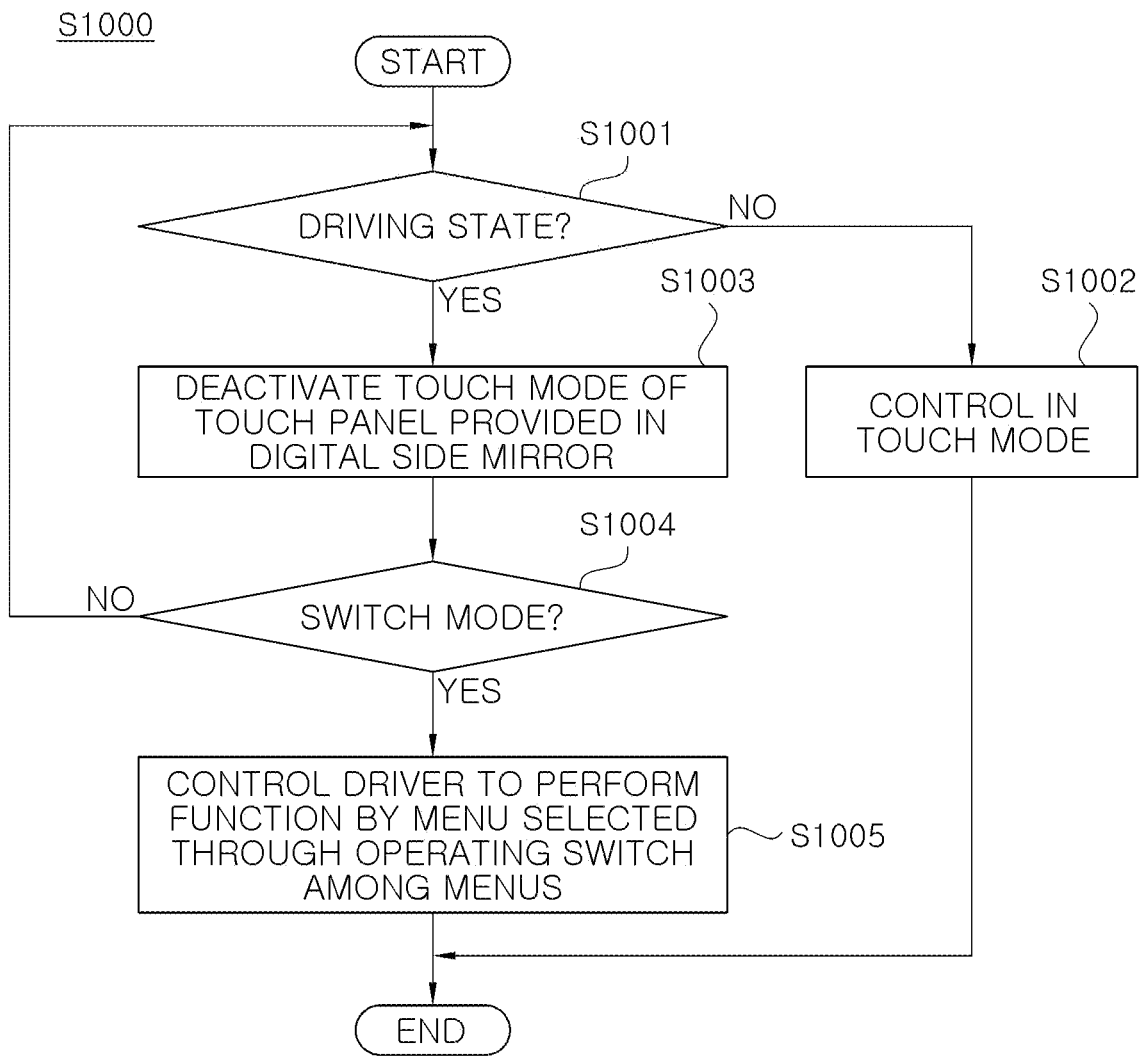
FIG. 10 is a flowchart illustrating a method of controlling the vehicle.

FIG. 10 is a flowchart illustrating a method of controlling the vehicle.

Hereinafter, the method (S1000) of controlling the vehicle will be described with reference to FIGS. 1 to 10. In describing the method, some features described above with reference to FIGS. 1 to 9 may be omitted for conciseness.

Referring to FIGS. 1 to 10, the method (S1000) may include determining whether the vehicle is in the driving state based on the vehicle speed (S1001). The determining may be performed by the first determination unit 121.

For example, if the vehicle speed is higher than or equal to the preset speed, the first determination unit 121 may determine the vehicle is in a driving state. As described above, the preset speed may be, for example, 10 km/h or any other preset speed.

If the vehicle speed is less than the preset speed, the second controller may control the one or more functions of the vehicle in the touch mode (S1002). For example, in the touch mode, a user may select one of the menus displayed on the touch panels 111b and 112b by a user's touch, and a function of the selected menu may be performed.

For example, for controlling pan and tilt of the displayed rear side image, the user may select pan and tilt menu M3 from the menus 515 illustrated in FIG. 5 by a user's touch. As illustrated in FIG. 7B, the user may select a rear side image at the driver's seat side or a rear side image at the passenger's seat in the reference numeral 701. The pan or the tilt of the selected rear side image may be controlled by dragging in one of the upper, lower, left and right directions while touching the screen.

If the vehicle is determined to be in the driving state, the first controller 122 may deactivate the touch mode of the touch panels 111b and 112b provided in the digital side mirror systems 111 and 112 (S1003).

As described above, the first digital side mirror system 111 may include the first camera 111a capturing the rear side image at the driver side, and the first touch panel 111b displaying the cropped rear side image among the captured rear side images at the driver side, and the second digital side mirror system 112 may include the second camera 112a capturing the rear side image at the passenger's seat, and the second touch panel 112b displaying the cropped rear side image among the captured rear side images at the passenger's seat.

As described above, the first camera 111a of the cameras 111a and 112a may be provided in the position in which a driver-side side mirror is generally disposed (e.g., outside the vehicle at the driver's seat), and the second camera 112a of the cameras 111a and 112a may be provided in the position in which a passenger-side side mirror is generally disposed (e.g., outside the vehicle at the passenger's seat).

The first touch panel 111b of the touch panels 111b and 112b may be provided in the lower portion of the A-pillar 31 at the driver's seat inside the vehicle, and the second touch panel 112b of the touch panels 111b and 112b may be provided in the lower portion of the A-pillar 31 at the passenger's seat inside the vehicle.

The captured rear image may be cropped and displayed according to the size of the touch panel, and the displayed rear side image may include the virtual region including a prescribed range of a field of view (FOV) according to predetermined regulations, and the menus may be displayed only in the region other than the virtual region of the displayed rear side image.

The second determination unit 123 may determine whether the vehicle is in a switch mode for controlling the function of the vehicle through the operating switch 113 (S1004).

The operating switch 113 may be provided on the crossbar 42 of the handle 41 as illustrated in FIG. 3, and as illustrated in FIG. 4, the operating switch 113 may be provided with the four direction buttons 113a to 113d indicating upper, lower, left and right movements, respectively, and the confirmation button 113e.

For example, in a case in which the confirmation button 113e of the operating switch 113 is pressed for a preset time or more, or the confirmation button 113e of the operating switch 113 is pressed a preset number of times for the preset time, the second determination unit 123 may determine the case as the switch mode.

As described above, the preset time may be, for example, several seconds, and the preset number may be, for example, two times.

If a mode of the vehicle is determined to be in the switch mode, the second controller 124 may control the driver 115 to perform the one or more functions by the menu selected through the operating switch 113 among the menus (S1005).

The menus 515 may include at least one of: opening or closing the window (M1), opening or closing the door (M2), pan and tilt of the displayed rear side image (M3), folding or unfolding the camera (M4), locking or unlocking the door (M5), the child lock (M6), and/or the brightness setting (M7).

The driver 115 may include the first driver for opening or closing the window, the second driver for opening or closing the door, the third driver for locking or unlocking the door or the child lock, the fourth driver for folding or unloading the camera, the image controller for controlling pan and tilt of the displayed image, and the brightness controller for controlling screen brightness of the touch panel.

As described above, if the vehicle is in the driving state, the touch mode of the touch panel of the digital side mirror system may be deactivated and the function of the vehicle may be controlled through the operating switch provided on the crossbar of the handle, thereby reducing the risk of accidents caused by the operation of the touch panel.

According to an aspect of the present disclosure, an apparatus for controlling a vehicle equipped with an operating switch linked to a touch panel of a digital side mirror system may comprise: a processor; a memory storing one or more programs configured to be executed by the processor; and the one or more programs include instructions for: a first determination unit configured to determine whether the vehicle is in a driving state; a first controller configured to deactivate a touch mode of the touch panel provided in the digital side mirror system when the vehicle is determined to be in the driving state; a second determination unit configured to determine whether the vehicle is in a switch mode for controlling the function of the vehicle through the operating switch; and a second controller configured to control a driver to perform a function from a menu selected through the operating switch when the vehicle is determined to be in the switch mode.

According to an aspect of the present disclosure, a method of controlling a vehicle equipped with an operating switch linked to a touch panel of a digital side mirror system may include: a first step of determining whether the vehicle is in a driving state, in a first determination unit; a second step of deactivating a touch mode of the touch panel provided in the digital side mirror system when the vehicle is determined to be in the driving state, in a first controller; a third step of determining whether the vehicle is in a switch mode for controlling the function of the vehicle through the operating switch, in a second determination unit; and a fourth step of controlling a driver to perform a function from a menu selected through the operating switch when the vehicle is determined to be in the switch mode, in the second controller.

According to an aspect of the present disclosure, there is provided a computer-readable storage medium in which a program for executing the method on a computer is recorded.

Figure 11:
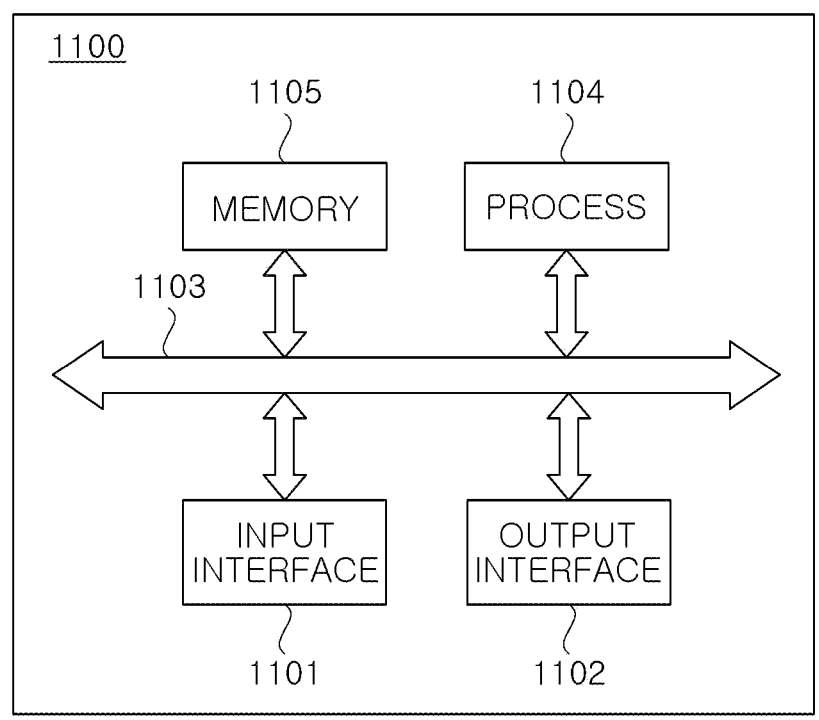
FIG. 11 is a block diagram of a computer device that may entirely or partially implement the apparatus for controlling the vehicle.

FIG. 11 is a block diagram of a computer device that may entirely or partially implement the apparatus for controlling the vehicle, and may be applied to the apparatus 100 for controlling a vehicle illustrated in FIG. 1.

As illustrated in FIG. 11, a computer device 1100 may include an input interface 1101, an output interface 1102, a processor 1104, and a memory 1105, and the input interface 1101, an output interface 1102, a processor 1104, and a memory 1105 may be connected to each other through a system bus 1103.

The memory 1105 may be used to store a program, command, or code, and the processor 1104 may perform the program, command, or code stored in the memory 1105, control the input interface 1101 to receive a signal and control the output interface 1102 to transmit the signal. The aforementioned memory 1105 may include a read-only memory and a random access memory, and may provide a command and data to the processor 1104.

It is to be understood that, the processor 1104 may be a central processing unit (CPU), and the processor 1104 may also be another universal processor, a digital signal processor (DSP), an application specific integrated circuit (ASIC), a field programmable gate array (FPGA) or another programmable logic device, separate gate or transistor logic device, separate hardware component and the like. The universal processor may be a microprocessor, or the processor may also be any conventional processor, or the like.

In an implementation process, the method performed in each device of FIG. 1 may be achieved by an integrated logic circuit of hardware and/or a command in the form of software within processor 1104. The content of the method described herein may be implemented to be performed and completed by a hardware processor, or by a combination of hardware and software modules of the processor. The software module may be stored in a memory such as a random access memory (RAM), a flash memory, a read-only memory (ROM), a programmable read-only memory (PROM), and/or an electrically erasable programmable memory (EEPM), a register, and the like, and the processor 1104 reads the information of the memory 1105 and executes the same with hardware to implement the content of the aforementioned method.

The present disclosure is not limited to the embodiment described above and the accompanying drawings. The scope of rights of the present disclosure is intended to be limited by the appended claims. It will be understood by those skilled in the art that various substitutions, modification and changes in form and details may be made therein without departing from the spirit and scope of the present disclosure as defined by the appended claims.

What is claimed is:

1. An apparatus comprising:
 a processor; and
 a memory storing instructions that, when executed by the processor, cause the apparatus to:
  determine whether a vehicle is in a driving state;
  deactivate, based on the vehicle being in the driving state, a touch mode of a touch panel associated with a digital side mirror system of the vehicle;
  determine whether the vehicle is in a switch mode for controlling at least one operation of the vehicle controlled by an operating switch provided separately from the touch panel; and
  perform, based on a menu item that is displayed on a display screen of the touch panel and selected via the operating switch and based on the vehicle being in the switch mode, an operation associated with the digital side mirror system.

2. The apparatus according to claim 1, further comprising the digital side mirror system, wherein the digital side mirror system comprises:
 a camera configured to capture a rear side image associated with the vehicle; and
 the touch panel, wherein the touch panel is configured to display a cropped image, associated with the captured rear side image, and menu items for controlling the at least one operation associated with the digital side mirror system, and wherein the touch panel is configured to identify at least one menu item of the menu items selected by a touch input received in the touch mode.

3. The apparatus according to claim 1, wherein the instructions, when executed by the processor, cause the apparatus to activate the switch mode based on:
 a confirmation button of the operating switch being pressed for a preset time period; or
 the confirmation button of the operating switch being pressed a preset number of times within a preset time period, and
 wherein the instructions, when executed by the processor, cause the apparatus to, while the touch mode is deactivated and the vehicle is in the driving state, determine whether the vehicle is in the switch mode.

4. The apparatus according to claim 2, wherein the menu items comprise at least one of: opening or closing of a window, opening or closing a door, panning and tilting of a displayed image, folding or unfolding the camera, locking or unlocking the door, a child lock, and a brightness setting.

5. The apparatus according to claim 1, wherein the instructions, when executed by the processor, cause the apparatus to control at least one of:
 a first driver for opening or closing of a window;
 a second driver for opening and closing a door;
 a third driver for locking or unlocking the door or a child lock;
 a fourth driver for folding or unfolding a camera;
 an image controller for controlling pan and tilt of a displayed image; or
 a brightness controller for controlling screen brightness of the touch panel,
 wherein activation of the switch mode enables the operating switch to operate as an input interface for the touch panel such that one or more items displayed on the display screen of the touch panel are controllable via the operating switch.

6. The apparatus according to claim 1, wherein the operating switch comprises a confirmation button and four direction buttons indicating up, down, left and right movements, respectively, and
 the operating switch is provided on a crossbar of a steering wheel of the vehicle.

7. The apparatus according to claim 2, wherein the digital side mirror system comprises at least one of:
 a first digital side mirror equipped with a first camera configured to capture a first rear side image and a first touch panel configured to display a cropped image associated with the captured first rear side image; and
 a second digital side mirror equipped with a second camera configured to capture a second rear side image and a second touch panel configured to display a cropped image associated with the captured second rear side image.

8. The apparatus according to claim 7, wherein the first camera is provided at a first exterior position, of the vehicle, that is associated with a driver's seat of the vehicle,
 the second camera is provided at a second exterior position, of the vehicle, that is associated with a passenger's seat of the vehicle, the first touch panel is provided in a lower portion of an A-pillar inside the vehicle at the driver's seat of the vehicle, and the second touch panel is provided in a lower portion of an A-pillar inside the vehicle at the passenger's seat of the vehicle.

9. The apparatus according to claim 2, wherein the instructions, when executed by the processor, cause the apparatus to crop and display the captured rear side image according to a size of the touch panel, wherein the displayed rear side image comprises a virtual region including a prescribed range of a field of view (FOV) according to predetermined regulations, and wherein the instructions, when executed by the processor, cause the apparatus to display the menu items in a region other than the virtual region.

10. The apparatus according to claim 1, wherein the instructions, when executed by the processor, cause the apparatus to limit a movement of a pointer into a region comprising a field of view (FOV) based on:

the pointer being displayed on the touch panel; and a control signal of the operating switch that indicates a movement of the displayed pointer into the region.

11. A method comprising:

determining, by a computing device, whether a vehicle is in a driving state;

deactivating, by the computing device and based on the vehicle being in the driving state, a touch mode of a touch panel associated with a digital side mirror system of the vehicle;

determining, by the computing device, whether the vehicle is in a switch mode for controlling at least one operation of the vehicle controlled by an operating switch provided separately from the touch panel; and performing, based on a menu item that is displayed on a display screen of the touch panel and selected via the operating switch and based on the vehicle being in the switch mode, an operation associated with the digital side mirror system.

12. The method according to claim 11, further comprising:

capturing, by a camera, a rear side image associated with the vehicle; and displaying, via the touch panel, a cropped image, associated with the captured rear side image, and menu items for controlling the at least one operation associated with the digital side mirror system; and identifying at least one menu item of the menu items selected by a touch input received in the touch mode.

13. The method according to claim 11, further comprising activating the switch mode based on:

a confirmation button of the operating switch being pressed for a preset time period; or the confirmation button of the operating switch being pressed a preset number of times within a preset time period, wherein the determining of whether the vehicle is in the switch mode comprises:

while the touch mode is deactivated and the vehicle is in the driving state, determining whether the vehicle is in the switch mode.

14. The method according to claim 12, wherein the menu items comprise at least one of: opening or closing of a window, opening or closing a door, panning and tilting of a displayed image, folding or unfolding of the camera, locking or unlocking of the door, a child lock, and brightness setting.

15. The method according to claim 11, further comprising controlling at least one of:

a first driver for opening or closing of a window;

a second driver for opening or closing a door;

a third driver for locking or unlocking the door or a child lock;

a fourth driver for folding or unfolding a camera;

an image controller for controlling pan and tilt of a displayed image; or a brightness controller for controlling screen brightness of the touch panel, wherein activation of the switch mode enables the operating switch to operate as an input interface for the touch panel such that one or more items displayed on the display screen of the touch panel are controllable via the operating switch.

16. The method according to claim 11, wherein the operating switch comprises a confirmation button and four direction buttons indicating up, down, left and right movements, respectively, and the operating switch is provided on a crossbar of a steering wheel of the vehicle.

17. The method according to claim 12, further comprising:

capturing, via a first digital side mirror equipped with a first camera, a first rear side image and displaying, via a first touch panel, a cropped image associated with the captured first rear side image; and capturing, via a second digital side mirror equipped with a second camera, a second rear side image and displaying, via a second touch panel, a cropped image associated with the captured second rear side image.

18. The method according to claim 17, wherein the first camera is provided at a first exterior position, of the vehicle, that is associated with a driver's seat of the vehicle, the second camera is provided at a second exterior position, of the vehicle, that is associated with a passenger's seat of the vehicle, the first touch panel is provided in a lower portion of an A-pillar inside the vehicle at the driver's seat of the vehicle, and the second touch panel is provided in a lower portion of an A-pillar inside the vehicle at the passenger's seat of the vehicle.

19. The method according to claim 12, further comprising:

cropping and displaying the captured rear side image according to a size of the touch panel, wherein the displayed rear side image comprises a virtual region including a prescribed range of a field of view (FOV) according to predetermined regulations; and displaying the menu items in a region other than the virtual region.

20. The method according to claim 11, further comprising limiting a movement of a pointer into a region comprising a field of view (FOV) based on:

the pointer being displayed on the touch panel; and a control signal of the operating switch that indicates a movement of the displayed pointer into the region.

* * * * *